(12) United States Patent
Gonopolskiy et al.

(10) Patent No.: US 10,378,909 B2
(45) Date of Patent: *Aug. 13, 2019

(54) STITCHING MIXED-VERSION MAP TILES IN HYBRID NAVIGATION FOR PARTIAL MAP UPDATES

(71) Applicant: HERE Global B.V., Eindhoven (NL)

(72) Inventors: Alex Gonopolskiy, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 200 days.

This patent is subject to a terminal disclaimer.

(21) Appl. No.: 15/148,442

(22) Filed: May 6, 2016

(65) Prior Publication Data

US 2017/0322037 A1 Nov. 9, 2017

(51) Int. Cl.
*G01C 21/32* (2006.01)
*G01C 21/36* (2006.01)

(52) U.S. Cl.
CPC ......... *G01C 21/32* (2013.01); *G01C 21/3667* (2013.01)

(58) Field of Classification Search
None
See application file for complete search history.

(56) References Cited

U.S. PATENT DOCUMENTS

| 5,614,895 A | 3/1997 | Ohomori et al. |
| 5,893,113 A | 4/1999 | McGrath et al. |
| 6,075,467 A | 6/2000 | Ninagawa |
| 6,343,301 B1 | 1/2002 | Halt et al. |
| 6,453,233 B1 | 9/2002 | Kato |
| 6,546,334 B1 | 4/2003 | Fukuchi et al. |
| 6,636,802 B1 | 10/2003 | Nakano et al. |
| 6,704,649 B2 | 3/2004 | Miyahara |

(Continued)

FOREIGN PATENT DOCUMENTS

| EP | 1944702 A1 | 7/2008 |
| JP | 2002-279437 A | 9/2002 |
| JP | 2011-002445 A | 1/2011 |

OTHER PUBLICATIONS

International Searching Authority, International Search Report and Written Opinion for International Application No. PCT/EP2017/060695, dated Jul. 19, 2017, 14 pages, European Patent Office, Netherlands.

(Continued)

*Primary Examiner* — Nicholas K Wiltey
(74) *Attorney, Agent, or Firm* — Alston & Bird LLP

(57) ABSTRACT

Methods, apparatus, computer program products, and systems related to partial map updates are provided. An example embodiment provides a method comprising receiving a map update for at least a first tile comprising map update data. The map update comprises updated map data for the first tile and previous map data for the first tile corresponding to one or more changed or new links intersected by a tile boundary between the first tile and a second tile. A map region of interest is determined, wherein the map region of interest comprises at least a portion of the first tile. The previous map data for the one or more changed or new links intersected by the tile boundary is used or displayed when a map update for the second tile has not been received and is not used or displayed when a map update for the second tile has been received.

20 Claims, 9 Drawing Sheets

(56) References Cited

U.S. PATENT DOCUMENTS

| | | | |
|---|---|---|---|
| 6,766,248 B2 | 7/2004 | Miyahara | |
| 7,403,852 B2 | 7/2008 | Mikuriya et al. | |
| 7,831,383 B2 | 11/2010 | Oohashi | |
| 8,005,612 B2 | 8/2011 | Asahara et al. | |
| 8,245,146 B2* | 8/2012 | Kinugawa | G09B 29/106 701/445 |
| 8,626,704 B2* | 1/2014 | Sawai | G06F 17/30241 707/602 |
| 9,401,093 B2* | 7/2016 | Gillet | G08G 5/0021 |
| 9,507,808 B2* | 11/2016 | Fischer | G06F 17/30289 |
| 9,863,774 B2* | 1/2018 | Gonopolskiy | G01C 21/32 |
| 2004/0125989 A1 | 7/2004 | Kimura | |
| 2005/0240943 A1* | 10/2005 | Smith | G06F 9/465 719/328 |
| 2005/0270306 A1 | 12/2005 | Nomura | |
| 2007/0198184 A1 | 8/2007 | Yoshioka et al. | |
| 2007/0282524 A1 | 12/2007 | Tanizaki et al. | |
| 2009/0234569 A1* | 9/2009 | Jansen | G01C 21/3446 701/532 |
| 2010/0011022 A1 | 1/2010 | Sugimoto et al. | |
| 2010/0299370 A1 | 11/2010 | Otto | |
| 2011/0191285 A1* | 8/2011 | Sawai | G01C 21/32 707/602 |
| 2012/0078512 A1 | 3/2012 | Schunder et al. | |
| 2013/0117322 A1 | 5/2013 | Fischer et al. | |
| 2014/0058661 A1 | 2/2014 | Choi et al. | |
| 2014/0300621 A1* | 10/2014 | Kim | G01C 21/26 345/592 |
| 2015/0170386 A1 | 6/2015 | Chawathe et al. | |
| 2015/0170387 A1 | 6/2015 | Chawathe et al. | |
| 2015/0170388 A1 | 6/2015 | Chawathe et al. | |
| 2015/0310038 A1 | 10/2015 | Richter | |
| 2015/0377632 A1 | 12/2015 | Pfeifle | |
| 2017/0052654 A1 | 2/2017 | Cervelli et al. | |
| 2017/0052655 A1 | 2/2017 | Cervelli et al. | |
| 2017/0322036 A1* | 11/2017 | Gonopolskiy | G01C 21/32 |
| 2017/0322037 A1* | 11/2017 | Gonopolskiy | G01C 21/32 |

OTHER PUBLICATIONS

Asahara, Akinori, et al., "Locally Differential Map Update Method with Maintained Road Connections for Telematics Services", IEEE 9$^{th}$ International Conference on Mobile Data Management, Apr. 27-30, 2008, Beijing, China.

* cited by examiner

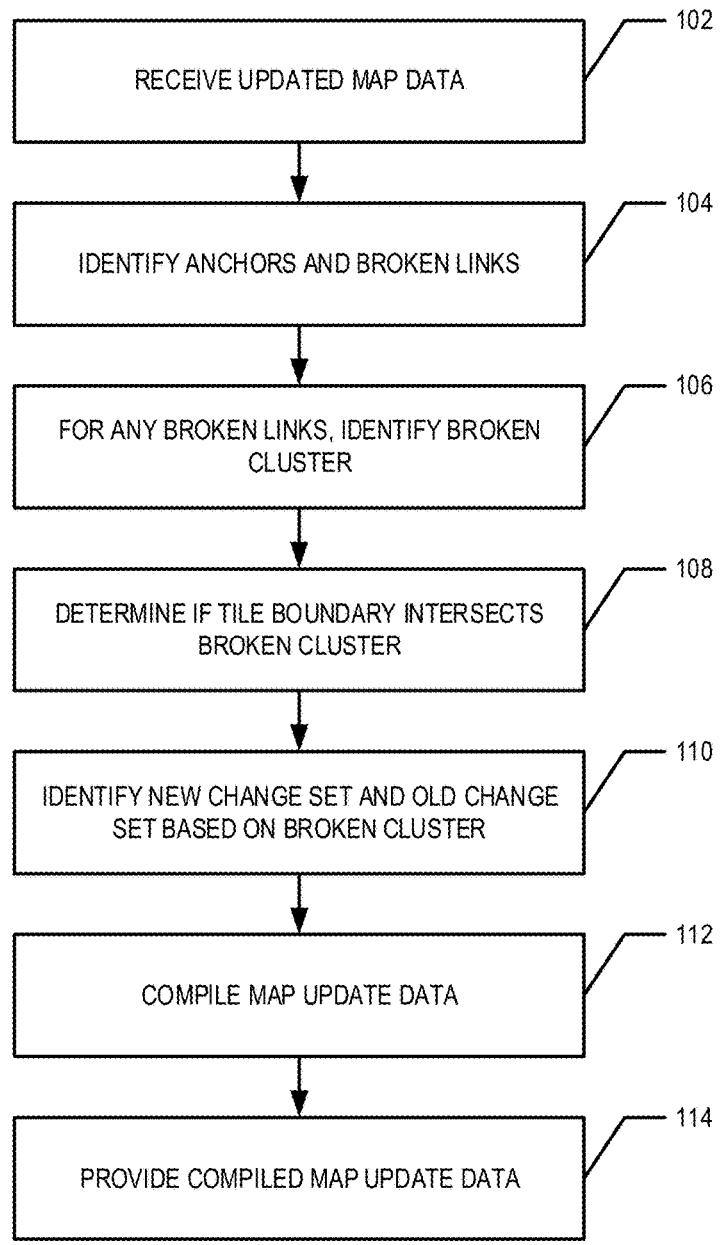

STITCHING MIXED-VERSION MAP TILES IN HYBRID NAVIGATION FOR PARTIAL MAP UPDATES

TECHNOLOGICAL FIELD

Example embodiments relate generally to partial map updates. In particular, example embodiments generally relate to the use of mixed-version map tiles in hybrid navigation for partial map updates.

BACKGROUND

In car navigation systems and other mobile systems can provide users with routes for traveling from an origin to a destination, a map of an area, alerts for hazards along a route, and/or the like based on stored map data. The map data stored by an in car navigation system or other mobile system may be updated frequently. For example, the map data may be stored in a tile-based format (e.g., MOS-F8, NDS, etc.) such that the map data may be updated in a modular fashion. For example, updated map data may be provided tile by tile. For example, a user wants a requested route to be provided as quickly as possible and may be unsatisfied with the time required to provide a route if the entire map is to be updated. In another example, the available bandwidth and/or connectivity of the user apparatus to the update server may be limited such that updating the entire map is not feasible.

If a map gets partially updated, the problem is that there are now tiles of different versions on the in car navigation system or other mobile system. For example, a map update for one tile may be received but a map update for an adjacent tile may not be received. Thus, the boundary where the two adjacent tiles meet may not be compatible because of changes in the road topology. However, any provided route or displayed map should be locally connected and functional.

BRIEF SUMMARY

Example embodiments are configured to provide the user (e.g., operating a user apparatus) with a locally connected and functional map that may be used to quickly provide routes or other information using the latest possible map version while not requiring that the entire map be updated simultaneously.

Methods, apparatus, and computer program products are provided in accordance with an example embodiment in order to provide a partial map update. In example embodiments, updated map data is received. The updated map data comprises a plurality of links. One or more changed or new links of the plurality of links are identified. A changed link is different than the corresponding link in previous map data and a new link does not have a corresponding link in the previous map data. A tiling of the updated map data is determined. Based on the tiling of the updated map data, it is determined that a tile boundary intersects at least one of the one or more changed or new links. The tile boundary is the boundary between a first tile and a second tile. A map update is compiled based on the updated map data, previous map data corresponding to the one or more changed or new links intersected by the tile boundary, and the tiling.

In accordance with an example embodiment, a method is provided. The method comprises receiving updated map data. The updated map data comprises a plurality of links. The method further comprises identifying one or more changed or new links of the plurality of links. A changed link is different than the corresponding link in previous map data and a new link does not have a corresponding link in the previous map data. The method further comprises determining a tiling of the updated map data and determining, based on the tiling of the updated map data, that a tile boundary intersects at least one of the one or more changed or new links. The tile boundary is the boundary between a first tile and a second tile. The method further comprises compiling a map update based on the updated map data, previous map data corresponding to the one or more changed or new links intersected by the tile boundary, and the tiling.

In an example embodiment identifying a changed or new link comprises determining if the previous map data comprises a corresponding link corresponding to a link of the plurality of links. In an example embodiment, the link of the plurality of links comprises link attributes and identifying one or more changed or new links of the plurality of links further comprises comparing the link attributes of the link to the link attributes of the corresponding link. In an example embodiment, the link attributes comprise one or more of a link identifier, link geometry, link location, intersection identifier, street number range, a traffic direction flow indicator, a carpool lane presence indicator, a car open indicator, a through traffic indicator, time restriction(s), a driving side indicator, a controlled access indicator, a service road indicator, a construction indicator, a ferry indicator, a private road indicator, or seasonal closures.

In an example embodiment, the previous map data corresponding to the one or more changed or new links intersected by the tile boundary corresponds to a fully connected broken cluster that is only partially contained with the first tile. In example embodiments, when the previous map data corresponding to the one or more changed or new links intersected by the tile boundary is for use or display when (a) map update data has not been provided for the second tile and (b) an area comprising the tile boundary between the first tile and the second tile is in a map region of interest. In an example embodiment, a link of the plurality of links represents a road section between a first intersection and a second intersection.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive updated map data. The updated map data comprises a plurality of links. The at least one memory and the computer program code are further configured to, with the processor, cause the apparatus to at least identify one or more changed or new links of the plurality of links. A changed link is different than the corresponding link in previous map data and a new link does not have a corresponding link in the previous map data. The at least one memory and the computer program code are further configured to, with the processor, cause the apparatus to at least determine a tiling of the updated map data and determine, based on the tiling of the updated map data, that a tile boundary intersects at least one of the one or more changed or new links. The tile boundary is the boundary between a first tile and an adjacent second tile. The at least one memory and the computer program code are further configured to, with the processor, cause the apparatus to at least compile a map update based on the updated map data, previous map data corresponding to the one or more changed or new links intersected by the tile boundary, and the tiling. The at least one memory and the computer program code are further configured to, with the processor, cause the apparatus to at least provide the map update for at least the first tile.

In example embodiments, to identify a changed or new link, the at least one memory and the computer program code are configured to, with the processor, cause the apparatus to at least determine if the previous map data comprises a corresponding link corresponding to a link of the plurality of links. In example embodiments the link of the plurality of links comprises link attributes and identifying one or more changed or new links of the plurality of links further comprises comparing the link attributes of the link to the link attributes of the corresponding link. In example embodiments, the link attributes comprise one or more of a link identifier, link geometry, link location, intersection identifier, street number range, a traffic direction flow indicator, a carpool lane presence indicator, a car open indicator, a through traffic indicator, time restriction(s), a driving side indicator, a controlled access indicator, a service road indicator, a construction indicator, a ferry indicator, a private road indicator, or seasonal closures.

In example embodiments, the previous map data corresponding to the one or more changed or new links intersected by the tile boundary corresponds to a fully connected broken cluster that is only partially contained with the first tile. In example embodiments, when the previous map data corresponding to the one or more changed or new links intersected by the tile boundary is for use or display when (a) map update data has not been provided for the second tile and (b) an area comprising the tile boundary between the first tile and the second tile is in a map region of interest. In example embodiments, a link of the plurality of links represents a road section between a first intersection and a second intersection.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive updated map data. The updated map data comprises a plurality of links. The computer-executable program code instructions further comprise program code instructions configured to identify one or more changed or new links of the plurality of links. A changed link is different than the corresponding link in previous map data and a new link does not have a corresponding link in the previous map data. The computer-executable program code instructions further comprise program code instructions configured to determine a tiling of the updated map data and determine, based on the tiling of the updated map data, that a tile boundary intersects at least one of the one or more changed or new links. The tile boundary is the boundary between a first tile and an adjacent second tile. The computer-executable program code instructions further comprise program code instructions configured to compile a map update based on the updated map data, previous map data corresponding to the one or more changed or new links intersected by the tile boundary, and the tiling. The computer-executable program code instructions further comprise program code instructions configured to provide the map update for at least the first tile.

In example embodiments, the link of the plurality of links comprises link attributes; identifying a changed or new link comprises determining if the previous map data comprises a corresponding link corresponding to a link of the plurality of links; and/or identifying one or more changed or new links of the plurality of links further comprises comparing the link attributes of the link to the link attributes of the corresponding link. In example embodiments, the previous map data corresponding to the one or more changed or new links intersected by the tile boundary corresponds to a fully connected broken cluster that is only partially contained within the first tile. In example embodiments, when the previous map data corresponding to the one or more changed or new links intersected by the tile boundary is for use or display when (a) map update data has not been provided for the second tile and (b) an area comprising the tile boundary between the first and second tile is in a map region of interest.

In accordance with yet another example embodiment of the present invention, an apparatus is provided. The apparatus comprises means for receiving updated map data, wherein the updated map data comprises a plurality of links. The apparatus further comprises means for identifying one or more changed or new links of the plurality of links, wherein a changed link is different than the corresponding link in previous map data and wherein a new link does not have a corresponding link in the previous map data. The apparatus further comprises means for determining a tiling of the updated map data and determining, based on the tiling of the updated map data, that a tile boundary intersects at least one of the one or more changed or new links. The tile boundary is the boundary between a first tile and an adjacent second tile. Additionally, the apparatus comprises means for compiling a map update based on the updated map data, previous map data corresponding to the at least one of the one or more changed or new links intersected by the tile boundary, and the tiling. Furthermore, the apparatus comprises means for providing the map update for at least the first tile.

Methods, apparatus, and computer program products are provided in accordance with an example embodiment in order to provide or use a map that has been partially updated. In example embodiments, map update data is received for at least a first tile. The map update data comprises updated map for the first tile and previous map data for the first tile corresponding to one or more changed or new links intersected by a tile boundary between the first tile and a second tile. A map region of interest is determined. The map region of interest comprises at least a portion of the first tile. In response to determining that the map region of interest comprises at least a portion of the second tile, it is determined if a map update for the second tile has been received. When it is determined that a map update for the second tile has been received, the previous map data for the one or more changed or new links intersected by the tile boundary is not used or displayed. When it is determined that a map update for the second tile has not been received, the previous map data for the one or more changed or new links intersected by the tile boundary is used or displayed.

In accordance with an example embodiment, a method is provided. The method comprises receiving a map update for at least a first tile. The map update comprises updated map data for the first tile and previous map data for the first tile corresponding to one or more changed or new links intersected by a tile boundary between the first tile and a second tile. The method further comprises determining a map region of interest. The map region of interest comprises at least a portion of the first tile. In response to determining that the map region of interest comprises at least a portion of the second tile, the method comprises determining if a map update for the second tile has been received. The method further comprises, (a) when it is determined that a map update for the second tile has been received, not using or displaying the previous map data for the one or more changed or new links intersected by the tile boundary and (b) when it is determined that a map update for the second has not been received, using or displaying the previous map data for the one or more changed or new links intersected by the tile boundary.

In an example embodiment, when it is determined that a map update for the second tile has been received, the method further comprises, using or displaying updated map data for the portion of the first tile within the map region of interest. In an example embodiment, the previous map data corresponding to the one or more changed or new links intersected by the tile boundary corresponds to a fully connected broken cluster that is only partially contained within the first tile. In example embodiments, the previous map data of the map update for the first tile only comprises previous map data for the portion of the fully connected broken cluster that is contained within the first tile. In example embodiments, the previous map data of the map update does not comprise previous map data for a link that is not a link of a fully connected broken cluster that is only partially contained within the first tile. In example embodiments, when it is determined that a map update for the second tile has not been received, the method further comprises, using or displaying the previous map data for only the fully connected broken cluster and the links thereof. In example embodiment, the previous map data of the map update consists of (a) previous map data for making the map locally connected across the tile boundary when the map update for the second tile has not been received and (b) an indication of the map version corresponding to the previous map data. In an example embodiment, the map region of interest is determined based on at least one of a current location, a route, or a zoom level.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive a map update for at least a first tile. The map update comprises updated map data for the first tile and previous map data for the first tile corresponding to one or more changed or new links intersected by a tile boundary between the first tile and a second tile. The at least one memory and the computer program code are further configured to, with the processor, cause the apparatus to at least determine a map region of interest. The map region of interest comprises at least a portion of the first tile. In response to determining that the map region of interest comprises at least a portion of the second tile, the at least one memory and the computer program code are further configured to, with the processor, cause the apparatus to at least determine if a map update for the second tile has been received. The at least one memory and the computer program code are further configured to, with the processor, cause the apparatus to at least (a) when it is determined that a map update for the second tile has been received, not use or display the previous map data for the one or more changed or new links intersected by the tile boundary and (b) when it is determined that a map update for the second has not been received, use or display the previous map data for the one or more changed or new links intersected by the tile boundary.

In an example embodiment, when it is determined that a map update for the second tile has been received, the at least one memory and the computer program code are further configured to, with the processor, cause the apparatus to at least, use or display updated map data for the portion of the first tile within the map region of interest. In an example embodiment, the previous map data corresponding to the one or more changed or new links intersected by the tile boundary corresponds to a fully connected broken cluster that is only partially contained within the first tile. In example embodiments, the previous map data of the map update for the first tile only comprises previous map data for the portion of the fully connected broken cluster that is contained within the first tile. In example embodiments, the previous map data of the map update does not comprise previous map data for a link that is not a link of a fully connected broken cluster that is only partially contained within the first tile. In example embodiments, when it is determined that a map update for the second tile has not been received, the at least one memory and the computer program code are further configured to, with the processor, cause the apparatus to at least, use or display the previous map data for only the fully connected broken cluster and the links thereof. In example embodiment, the previous map data of the map update consists of (a) previous map data for making the map locally connected across the tile boundary when the map update for the second tile has not been received and (b) an indication of the map version corresponding to the previous map data. In an example embodiment, the map region of interest is determined based on at least one of a current location, a route, or a zoom level.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive a map update for at least a first tile. The map update comprises updated map data for the first tile and previous map data for the first tile corresponding to one or more changed or new links intersected by a tile boundary between the first tile and a second tile. The computer-executable program code instructions further comprise program code instructions configured to determine a map region of interest. The map region of interest comprises at least a portion of the first tile. The computer-executable program code instructions further comprise program code instructions configured to, in response to determining that the map region of interest comprises at least a portion of the second tile, determine if a map update for the second tile has been received. The computer-executable program code instructions further comprise program code instructions configured to (a) when it is determined that a map update for the second tile has been received, not use or display the previous map data for the one or more changed or new links intersected by the tile boundary and (b) when it is determined that a map update for the second has not been received, use or display the previous map data for the one or more changed or new links intersected by the tile boundary.

In an example embodiment, the computer-executable program code instructions further comprise program code instructions configured to, when it is determined that a map update for the second tile has been received, use or display updated map data for the portion of the first tile within the map region of interest. In an example embodiment, the previous map data corresponding to the one or more changed or new links intersected by the tile boundary corresponds to a fully connected broken cluster that is only partially contained within the first tile. In example embodiments, the previous map data of the map update for the first tile only comprises previous map data for the portion of the fully connected broken cluster that is contained within the first tile. In example embodiments, the previous map data of the map update does not comprise previous map data for a link that is not a link of a fully connected broken cluster that is only partially contained within the first tile. In example embodiments, the computer-executable program code instructions further comprise program code instructions configured to, when it is determined that a map update for the second tile has not been received, use or display the previous map data for only the fully connected broken cluster and the links thereof. In example embodiment, the previous map data of the map update consists of (a) previous map data for making the map locally connected across the tile boundary when the map update for the second tile has not been received and (b) an indication of the map version corresponding to the previous map data. In an example embodiment, the map region of interest is determined based on at least one of a current location, a route, or a zoom level.

In accordance with yet another example embodiment of the present invention, an apparatus is provided. The apparatus comprises means for receiving a map update for at least a first tile. The map update comprises updated map data for the first tile and previous map data for the first tile corresponding to one or more changed or new links intersected by a tile boundary between the first tile and a second tile. The apparatus further comprises means for determining a map region of interest. The map region of interest comprises at least a portion of the first tile. The apparatus further comprises means for, in response to determining that the map region of interest comprises at least a portion of the second tile, determining if a map update for the second tile has been received. The apparatus further comprises means for, (a) when it is determined that a map update for the second tile has been received, not using or displaying the previous map data for the one or more changed or new links intersected by the tile boundary, and (b) when it is determined that a map update for the second has not been received, using or displaying the previous map data for the one or more changed or new links intersected by the tile boundary.

BRIEF DESCRIPTION OF THE DRAWINGS

Figure 1:
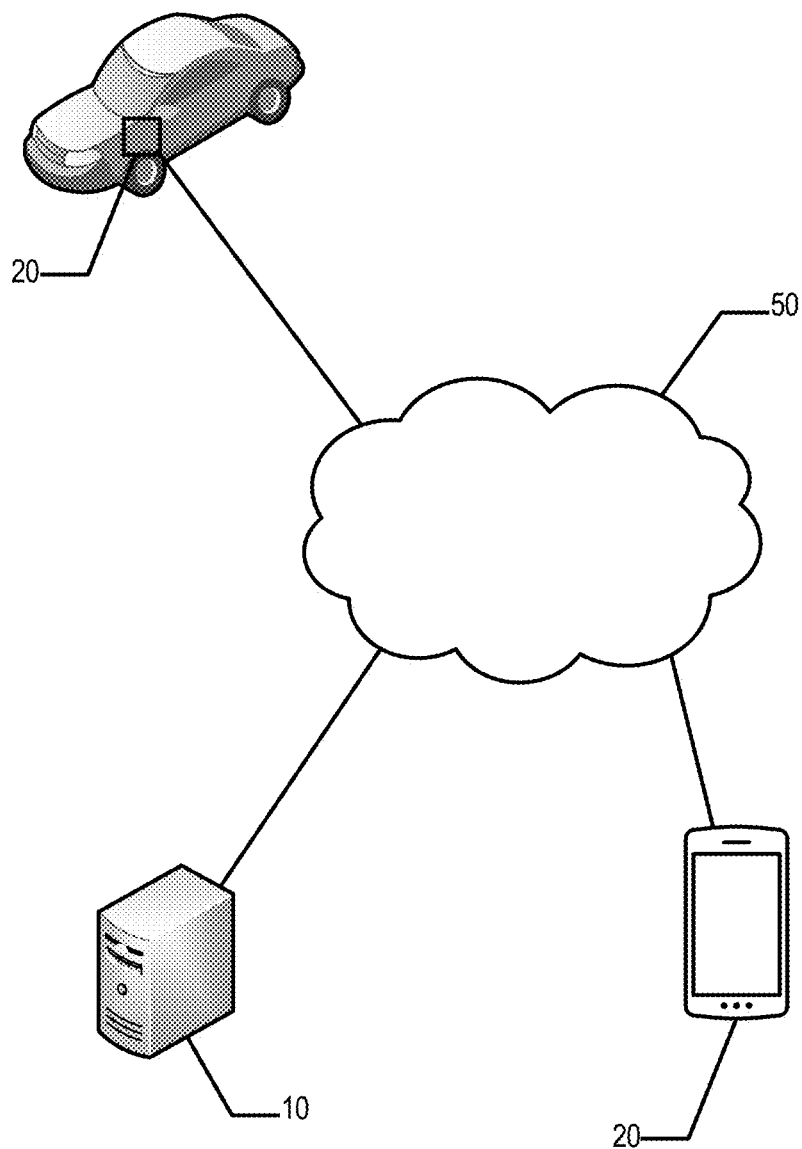
Figure 2A:
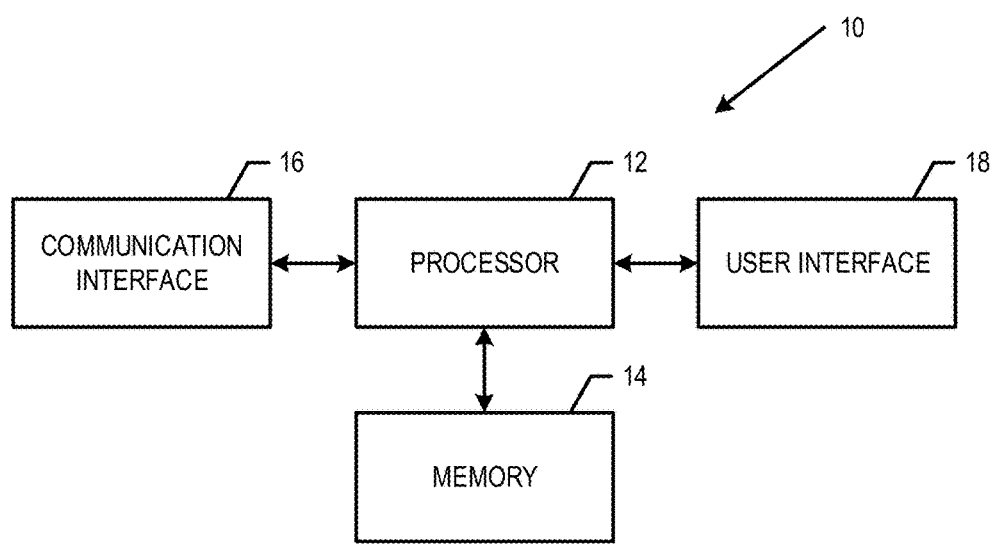
Figure 2B:
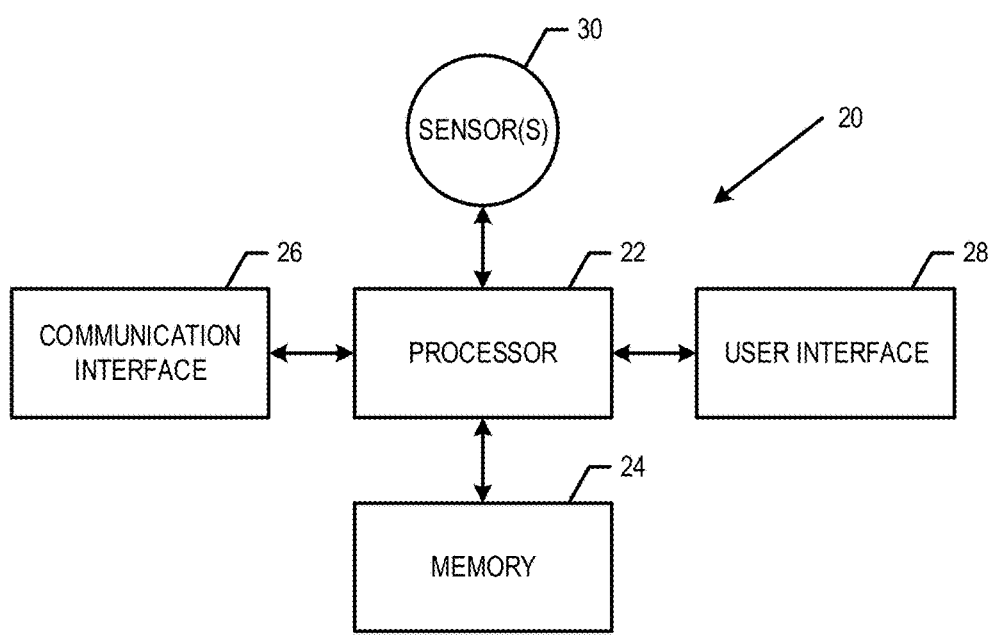
Figure 3A:
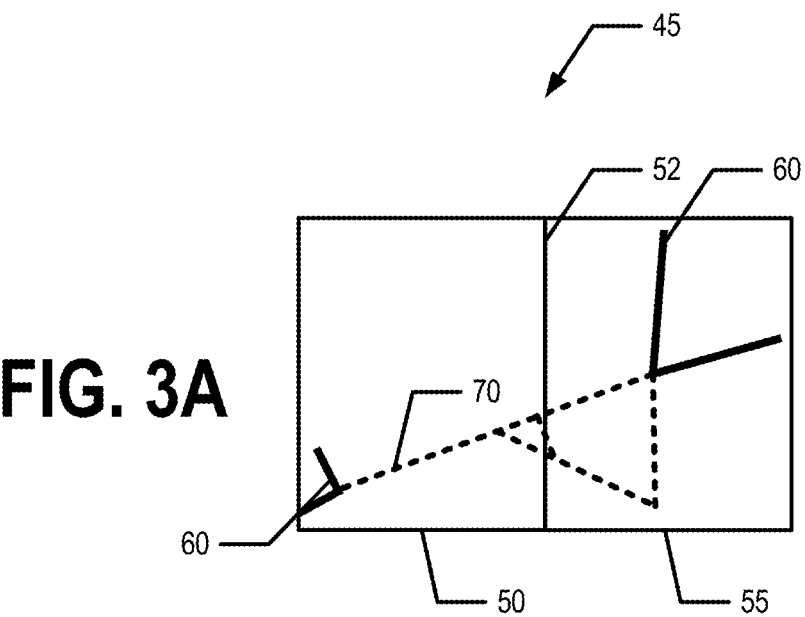
Figure 3B:
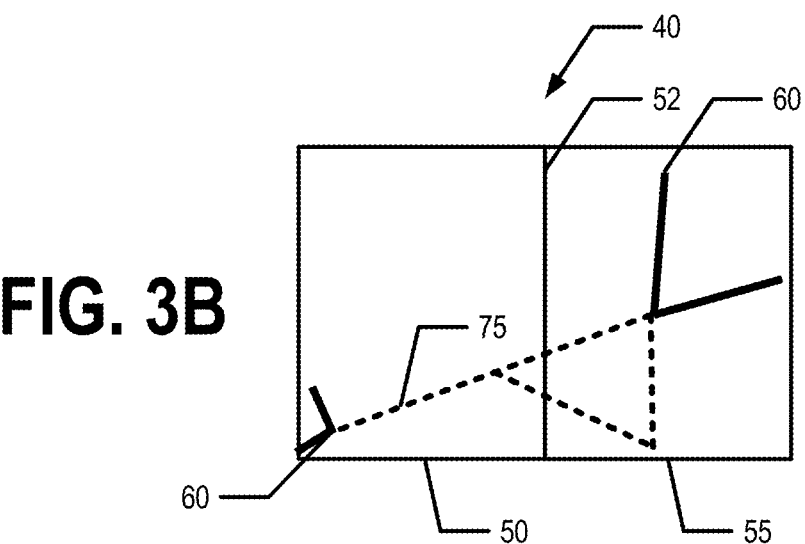
Figure 5:
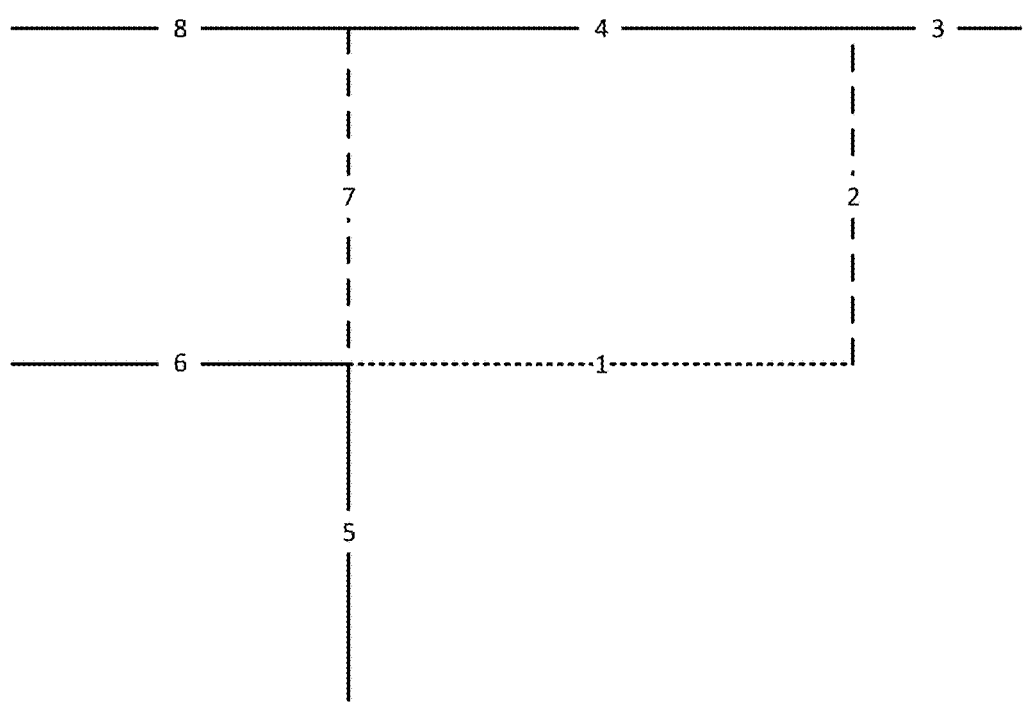
Figure 6:
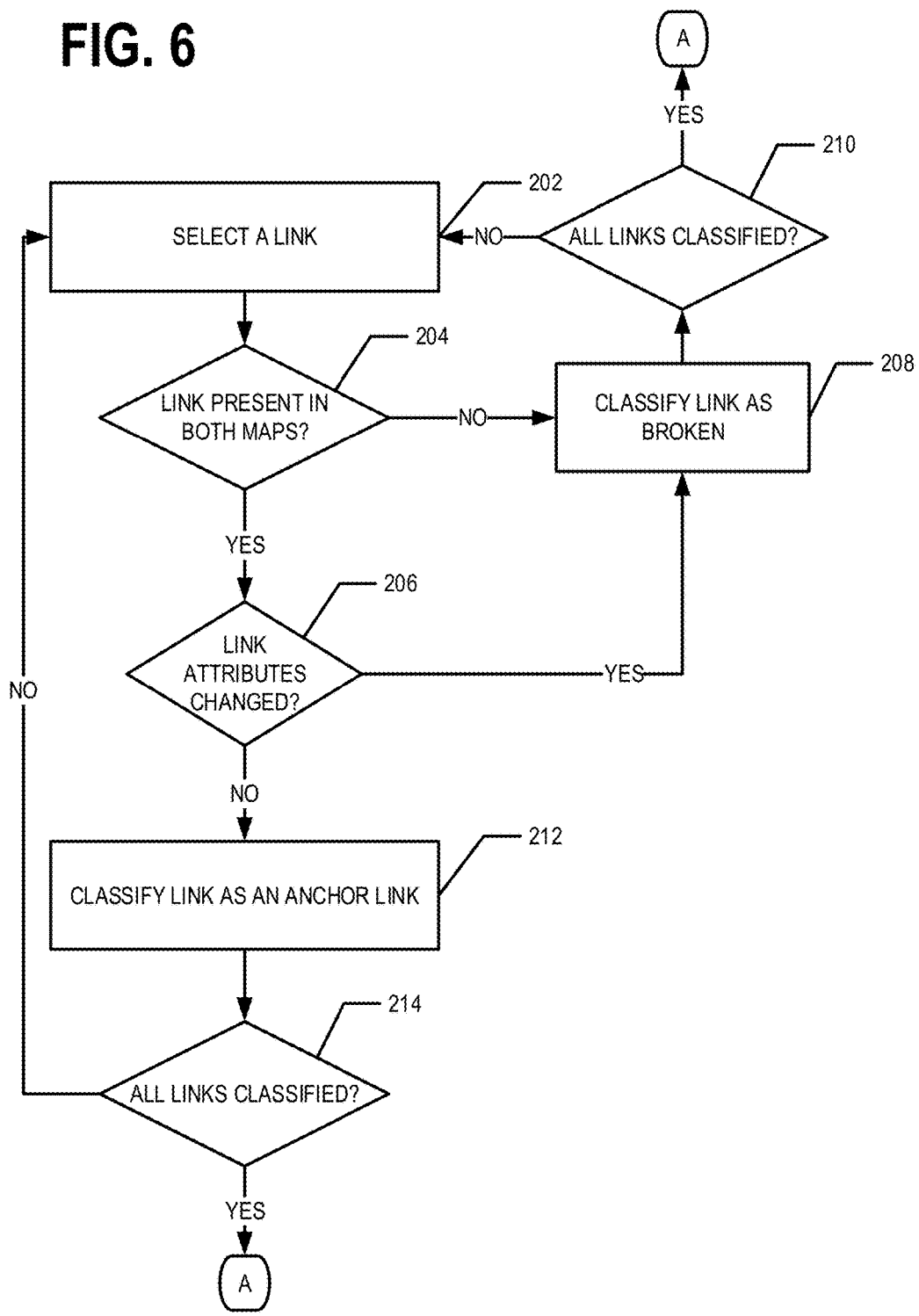
Figure 7:
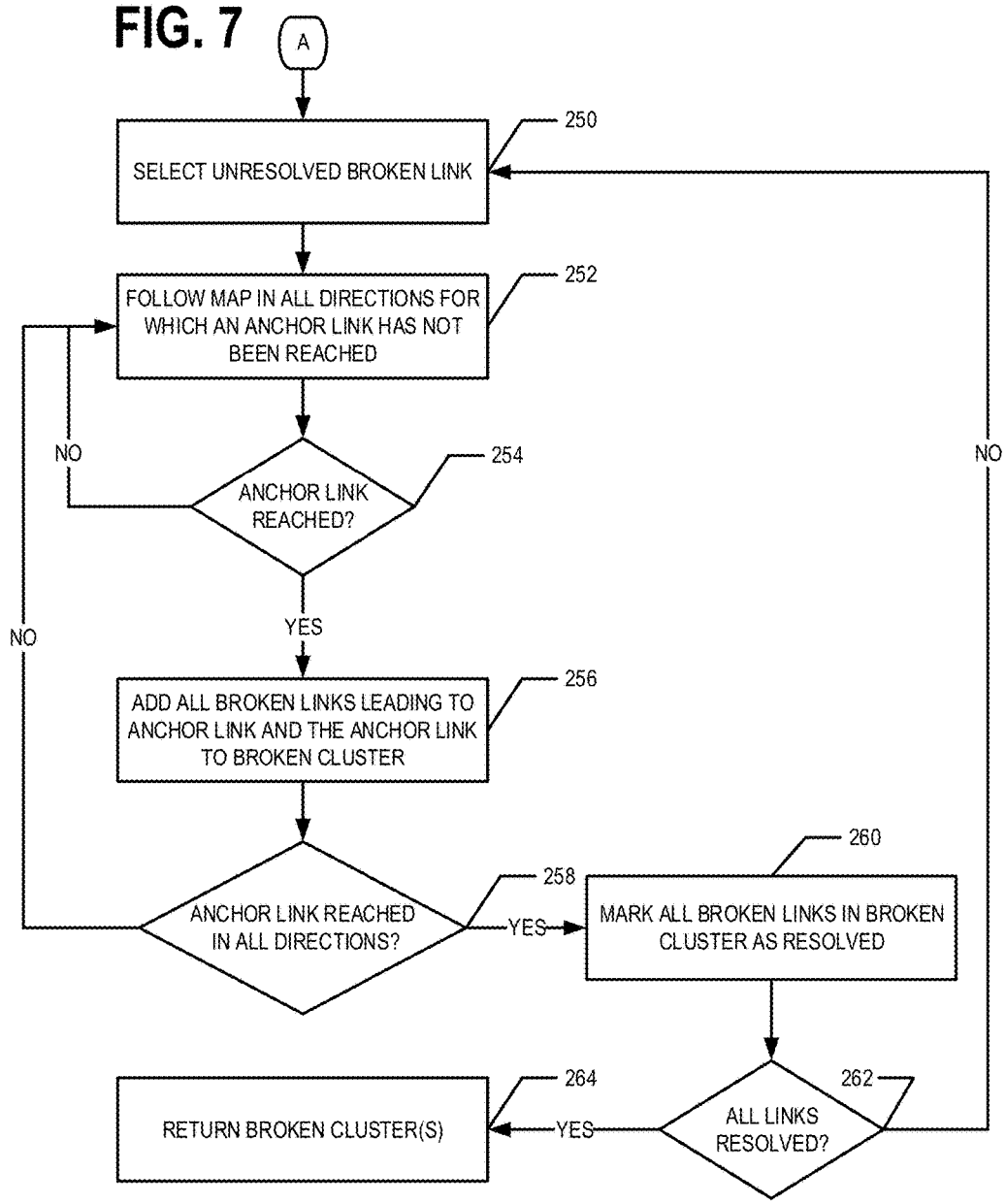
Figure 8:
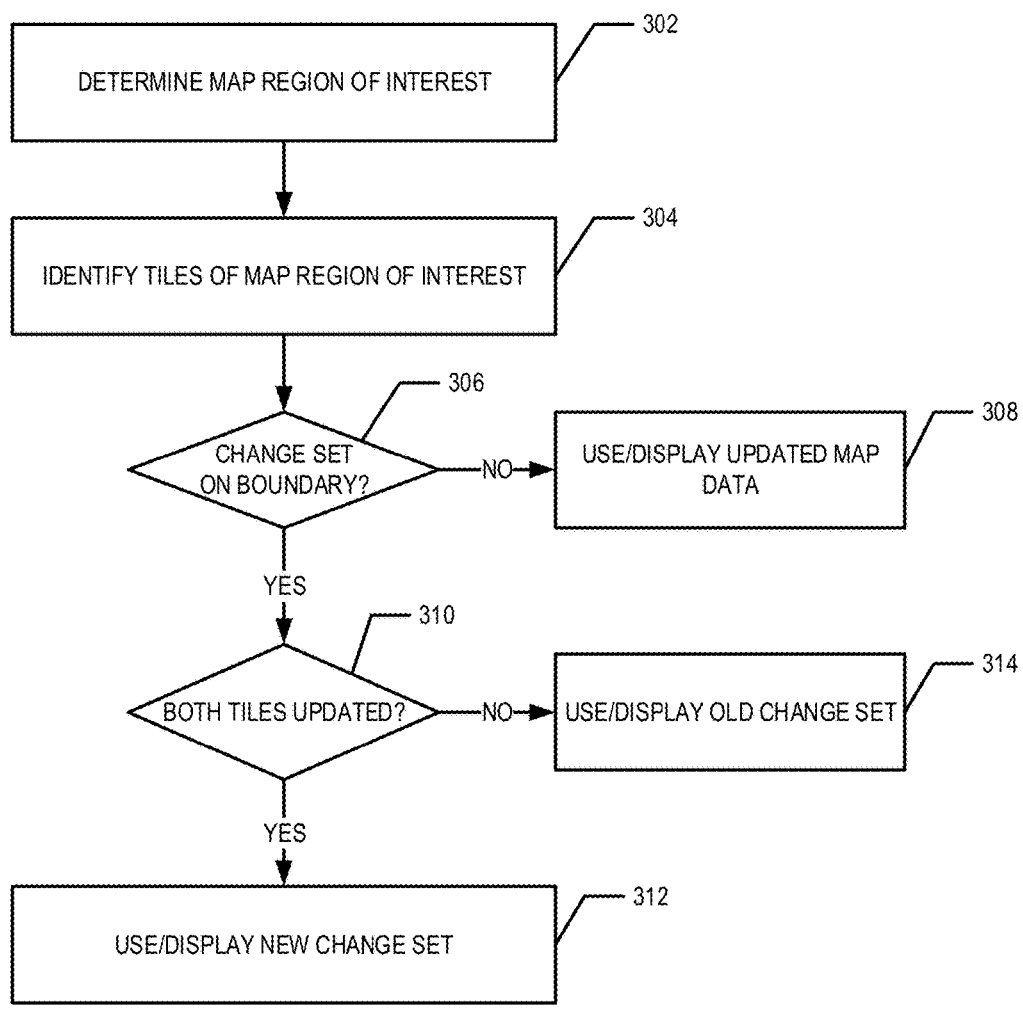

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an update apparatus that may be specifically configured in accordance with an example embodiment;

FIG. 2B is a block diagram of an user apparatus that may be specifically configured in accordance with an example embodiment;

FIG. 3A shows previous map data for two example tiles, in accordance with an example embodiment;

FIG. 3B shows updated map data for the two example tiles shown in FIG. 3A, in accordance with an example embodiment;

FIG. 4 is a flowchart illustrating operations performed, such as by the update apparatus of FIG. 2A, in order to provide map updates for one or more tiles, in accordance with an example embodiment;

FIG. 5 shows a schematic diagram of a broken cluster, in accordance with an example embodiment;

FIG. 6 is a flowchart illustrating operations performed, such as by the update apparatus of FIG. 2A, in order to determine if a link is an anchor or a broken link, in accordance with an example embodiment;

FIG. 7 is a flowchart illustrating operations performed, such as by the update apparatus of FIG. 2A, in order to identify a broken cluster, in accordance with an example embodiment; and FIG. 8 is a flowchart illustrating operations performed, such as by the user apparatus of FIG. 2B, in order to use/display a map using mixed-version tiles, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide map updates for a tiled map. For example, the map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population density within the map region, and/or the like.

In various situations, a boundary between an updated version tile and an adjacent previous version tile may need to be navigated across. If the updated version tile includes changes in the area near the boundary between the tiles, a section of road in the updated version tile may not properly align across the boundary with the corresponding section of road in the previous version tile. Example embodiments ensure consistency of road sections or links across tile boundaries wherein one tile is an updated version tile and the adjacent tile is a previous version tile. As used herein, a link may be a portion of a road, street, highway, path, and/or the like between a first intersection and a second intersection. In example embodiments, the first intersection and the second intersection may be adjacent intersections (e.g., after passing through the first intersection, the second intersection may be the next intersection you come to when traveling along the link).

FIG. 1 provides an illustration of an example system that can be used in conjunction with various embodiments of the present invention. As shown in FIG. 1, the system may include one or more user apparatus 20, one or more update apparatus 10, one or more networks 50, and/or the like. In various embodiments, the user apparatus 20 may be an in vehicle navigation system, a mobile computing device, and/or the like. For example, in vehicle navigation system mounted within and/or be onboard a vehicle such as a motor vehicle, non-motor vehicle car, scooter, truck, van bus, motorcycle, bicycle, Segway, golf cart, and/or the like. In various embodiments, the user apparatus 20 may be a smartphone, tablet, personal digital assistant (PDA), and/or other mobile computing device. In example embodiments, an update apparatus 10 may comprise components similar to those shown in the example update apparatus 10 diagrammed in FIG. 2A. In example embodiments, a user apparatus 20 may comprise components similar to those shown in the example user apparatus 20 diagrammed in FIG. 2B. In various embodiments, the update apparatus 10 may be located remotely from the user apparatus 20. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), cellular network, and/or the like. For example, a user apparatus 20 may be in communication with an update apparatus 10 via the network 50. For example, the user apparatus 20 may communicate with the update apparatus 10 via the Cloud.

In example embodiments, as shown in FIG. 2B, the user apparatus 20 may comprise a processor 22, memory 24, a user interface 28, one or more sensors 30 (e.g., a location sensor such as a GPS sensor), a communications interface 26, and/or other components configured to perform various operations, procedures, functions or the like described herein. Similarly, as shown in FIG. 2A, the update apparatus 10 may comprise a processor 12, memory 14, a user interface 18, a communications interface 16, and/or other components configured to perform various operations, procedures, functions or the like described herein. Example embodiments of the user apparatus 20 and the update apparatus 10 are described in more detail below with respect to FIGS. 2A and 2B.

II. Exemplary Operation

In example embodiments, updated map information/data may be received and it may be determined if/which links have been updated, changed, or added in the updated map information/data compared to the previous map information/data. In various embodiments, the previous map information/data may refer to map information/data from the version of the map that immediately proceeds the updated version of the map corresponding to the updated map information/data. In other embodiments, the previous map information/data is map information/data from a previous version of the map but need not be from the immediately preceding version of the map. In example embodiments, a link may comprise and/or be associated with one or more link attributes. For example, the link attributes may comprise one or more of a link identifier configured to (uniquely) identify a link, link geometry information/data configured to describe the shape and/or length of the link, a link location configured to provide geo-location information for one or both ends of a link, one or more intersection identifiers configured to identify one or more intersections that define an end of the link, a range of street numbers configured to identify the street numbers located along the link, a traffic direction flow indicator, a carpool lane presence indicator, a car open indicator, a through traffic indicator, time restriction(s), a driving side indicator, a controlled access indicator, a service road indicator, a construction indicator, a ferry indicator, a private road indicator, seasonal closures, link height/weight restrictions, and/or the like.

In example embodiments, it may be determined if a link has been updated, changed, or added in the updated map information/data by comparing the link attributes for the link to the link attributes for links in the previous map information/data (e.g., the map information/data present on the update apparatus 10 or map information/data database accessible by the updated apparatus 10 at the time the updated map information/data is received). In other example embodiments, it may be determined if a link has been updated, changed, or added in the updated map information/data by looking for change flags indicating that an attribute of a link has been changed.

Once new and old change sets for the updated map information/data and the previous map information/data are identified, the map update information/data may be compiled. The map update information/data may comprise the updated map information/data, a new change set, and/or an old change set, wherein a new change set may comprise zero, one, or more links from the updated map information/data and the old change set may comprise zero, one, or more links from the previous map information/data. The map update information/data provides a tile of the updated version of the map consistent with an adjacent tile of the previous version of the map. For example, the of change set may comprise previous map information/data for a link that has been changed in the updated map information/data with respect to the previous map information/data.

One or more tiles of the updated version of the map may then be provided. For example, one or more tiles of the updated version of the map may be transmitted through a wired or wireless network (e.g., network 50). At least one of the one or more provided tiles of the updated version of the map may be received and used to display a map region, determine and/or navigate a route, and/or the like.

For example, FIG. 3A illustrates a first tile 50 and a second tile 55 of a new version of a map 45. FIG. 3B illustrates the same first tile 50 and second tile 55 in a previous version of the map 40. The first tile 50 and the second tile 55 are adjacent tiles sharing tile boundary 52. The dotted links show the broken links 70 of a broken cluster of the updated map information/data intersected by the tile boundary 52 and the corresponding links 75 in the previous map information/data. The thick solid links show the anchor links 60 immediately adjoining the broken links 70 of the broken cluster. The anchor links 60 are present and unchanged between the new version of the map 45 and the previous version of the map 40. If the first tile 50 of the new map version 45 and the second tile 50 the previous map version 40 were used together, the user experience would likely be unsatisfactory and confusing. Thus, a portion of the previous map information/data may be added to the updated map information/data to provide map update information/data that comprises the information needed for the first tile 50 and the second tile 55 to be consistent across the tile boundary 52. Various aspects of example embodiments will now be described in more detail with regards to FIGS. 4-7.

Exemplary Provision of Map Updates

FIG. 4 provides a flowchart illustrating various operations and procedures that may be completed in accordance with an example embodiment of the present invention to provide a map update. In particular, example embodiments relate to providing a partial map update. For example, map update information/data for one or more tiles may be provided, however, map update information/data may not always be provided for all of the tiles in the map. Starting at block 102, updated map information/data is received. For example, the update apparatus 10 may receive updated map information/data. For example, the update apparatus 10 may comprise means, such as the processor 12, the communication interface 16, user interface 18, or the like, for receiving the updated map information/data. For example the updated map information/data may comprise map information/data comprising a plurality of links and the corresponding link attributes. For example, the updated map information/data may provide the map information/data needed to provide an updated version of the map.

At block 104, anchor links and broken links are identified. For example, the update apparatus 10 may identify anchor links and broken links. For example, the update apparatus 10 may comprise means, such as the processor 12 or the like, for identifying anchor links and broken links. In example embodiments, an anchor link is a link that is substantially the same in the updated map information/data as in the previous map information/data. For example, an anchor link may be a link that is not significantly updated or changed from the previous version of the map information/data. In example embodiments, a broken link may be a link that has been significantly changed from the previous version of the map information/data or that was not present in the previous version of the map information/data. In some embodiments, a link may be significantly changed or different from the corresponding link in the previous map information/data if any of the link attributes for the link are different from the corresponding link attribute for the corresponding link in the previous map information/data and/or if a change flag associated with any of the link attributes indicates a change in an attribute for the link. For example, a new link may be classified as a broken link, since the new link was not present in the previous map information/data. In various embodiments, each link in the updated map information/data is classified as either an anchor link or a broken link. An example method for identifying anchor links and broken links is described in more detail elsewhere herein.

At block 106, for any broken links identified, a broken cluster is identified. For example, the update apparatus 10 may identify a broken cluster for any broken links identified. For example, the update apparatus 10 may comprise means, such as a processor 12 or the like, for identifying a broken cluster for any broken links identified. For example, if a broken link is identified, a broken cluster for the broken link is identified. For example, a fully connected broken cluster comprising the broken link may be identified. For example, the links in the previous map information/data corresponding to the broken links comprising the broken cluster may be a fully connected cluster of links in the previous map information/data bordered by the anchor links of the broken cluster. For example, once a broken link is identified, the map may be traversed in all directions from the broken link. For each link that the process comes to, it may be determined if the link is an anchor link or a broken link. If the link is a broken link, the broken link is added to the broken cluster and the process continues to traverse the map in that direction. If the link is an anchor link, the anchor link is remembered and process stops in that direction. In example embodiments, one broken cluster may be identified for each set of connected broken links.

FIG. 5 provides an example schematic of identifying a broken cluster, wherein the solid lines represent anchor links and the non-solid lines represent broken links. It is determined that link 1, shown as the dotted line, is a broken link. The map is then traversed in all directions from link 1. On the right side of link 1, a second broken link, link 2, is identified. Following the map along link 2, two anchor links, links 3 and 4, are reached. The link identifiers for links 3 and 4 are stored in association with the broken cluster and the process stops traversing the map in that direction. On the left side of link 1, there are three directions in which the map may be traversed. Links 5 and 6 are anchor links. Therefore, the link identifiers for links 5 and 6 are stored in associated with the broken cluster and the process stops traversing the map in those directions. It is determined that link 7 is a broken link. Link 7 is added to the broken cluster and the process continues to traverse the map along link 7. Links 8 and 4 are then reached, which are both anchor links. Thus, link identifiers for links 8 and 4 are stored in associated with the broken cluster and the process stops traversing the map in that direction. Thus, this example broken cluster is a fully connected change cluster comprising links 1, 2, and 7 and bordered by anchor links 3, 4, 5, 6, and 8.

Returning to FIG. 4, at block 108, it is determined if a broken cluster is intersected by a tile boundary. For example, it is determined if part of a broken cluster is in one tile and part of the broken cluster is in another tile. For example, the update apparatus 10 may determine if a broken cluster is intersected by a tile boundary. For example, the update apparatus 10 may comprise means, such as the processor 12 or the like, for determining if a broken cluster is intersected by a tile boundary. If it is determined that the broken cluster is not intersected by a tile boundary (e.g., the broken cluster is fully contained within one tile), then the changes between the new map version and the previous map version based on the broken cluster will not cause any issues when navigating across a tile boundary or when displaying two adjacent map tiles.

If a broken cluster is intersected by a tile boundary, then the new change set and the old change set for each map tile comprising a portion of the broken cluster are identified, at block 110. For example, responsive to determining that a broken cluster is intersected by a tile boundary, the links in the previous map information/data corresponding to the broken cluster are identified. For example, a broken link in the previous map information/data of the broken cluster may correspond to a link in the previous map information/data that has been changed or is not present in the updated map information/data. The broken links of the broken cluster identified in the previous map information/data comprise the old change set. Similarly, the broken links of the broken cluster identified in the updated map information/data comprise the new change set. In example embodiments, the new change set may be non-empty and the old change set may be an empty set, or vice-versa, depending on the changes made to the map between the updated map information/data and the previous map information/data. For example, the update apparatus 10 may identify the new change set and the old change set for a map tile based on one or more broken clusters that are each only partially contained within the map tile. For example, the update apparatus 10 may comprise means, such as processor 12 or the like, for identifying the new change set and the old change set for a map tile based on one or more broken clusters that are each only partially contained within the map tile.

At block 112, the map update information/data may be compiled. For example, map update information/data may be compiled for one or more map update tiles. In example embodiments, the map update information/data comprises the updated map information/data, a new change set, and an old change set. Each change set may be marked with an indication of which map version the change set information/data is from (e.g., the new version, the previous version, the version from Apr. 19, 2016, version 3.6.9, and/or the like). For example, the new change set may comprise updated map information/data related to one or more broken links in the new version of the map and the old change set may comprise previous map information/data related to one or more broken links in the previous version of the map. In some scenarios, the new change set for a map tile, old change set for a map tile, or both change sets for a map tile may be empty sets. For example, the update apparatus 10 may compile the map update information/data. For example the update apparatus 10 may comprise means, such as the processor 12 or the like, for compiling the map update information/data. For example, the compiling of the map update information/data may comprise packaging the updated map information/data, the new change set for the tile, and the old change set for the tile into tiles of map update information/data. In example embodiments, compiling the map update information/data may comprise embedding a new change set and/or an old change set into tiles of updated map information/data. For example the new change set may comprise a set of changed components from the updated map information/data and the old change set may comprise a set of changed components from the previous map information/data, wherein the change is with respect to the other map version. For example, the map update information/data may comprise a new change set of changed components marked as corresponding to the new version of the map, and an old change set of changed components marked as corresponding to the previous version of the map. For example, the new change set of changed components may comprise one or more broken clusters for the new map version that cross a tile boundary and the old change set of changed components may comprise the previous map information/data for the links corresponding to the one or more broken clusters that cross a tile boundary in the previous map version. For example, the links shown as the dashed lines (70) in FIG. 3A may comprise the new change set marked as corresponding to the new version of the map and the links shown as the dashed lines (75) in FIG. 3B may comprise the old change set marked as corresponding to the previous version of the map for their respective tiles. In example embodiments, the new change set and/or the old change set may be an empty set. In example embodiments, the new change set and/or the old change set may be embedded into the new version map tiles as layers, additional payload, and/or the like.

At block 114, at least a portion of the compiled map update information/data is provided. For example, compiled map update/information for at least one tile of the new version of the map may be provided. For example, the update apparatus 10 may provide at least a portion (e.g., at least one tile) of the compiled map update information/data. For example, the update apparatus 10 may comprise means, such as the processor 12, communications interface 16, or the like, for providing at least a portion (e.g., at least one tile) of the compiled map update information/data. As noted above, the compiled map updated information/data may be provided in blocks or packages each relating to one tile. For example, the compiled map update information/data may be provided corresponding to an integer number of tiles may be provided.

Exemplary Identification of Anchor Links and Broken Links

FIG. 6 provides a flowchart illustrating operations performed to identify anchor links and broken links in the updated map information/data, in accordance with an example embodiment. For example, for each link in the updated map information/data, it may be determined if the link is an anchor link or a broken link. Starting at block 202, an unclassified link is selected. For example, each link of the updated map information/data may be marked as unclassified previous to beginning to identify the anchor links and the broken links. The process of identifying the anchor links and broken links may continue until all of the links in the updated map information/data and/or previous map information/data are classified. For example, the apparatus 10 may select a link in the updated map information/data and/or previous map information/data marked as unclassified. For example, the apparatus 10 may comprise means, such as the processor 12 or the like for selecting a link in the updated map information/data and/or previous map information/data marked as unclassified.

At block 204, it may be determined if the link exists in both the new version of the map and the previous version of the map. For example, the apparatus 10 may determine if the link exists in both the new version of the map and the previous version of the map. For example, the apparatus 10 may comprise means, such as the processor 12 or the like, for determining if the link is exists in both the new version of the map and the previous version of the map. For example, the selected link from the updated map information/data may be compared to the previous map information/data. For example, it may be determined if a corresponding link exists in the previous map information/data. For example, based on the link identifier associated with the selected link, it may be determined if a corresponding link exists in the previous map information/data.

If it is determined, that the link only exists in either the new version of the map or the previous version of the map, or in response thereto, the link is classified as a broken link at block 208. In example embodiments, a broken link is a link in either the updated map information/data or the previous map information/data for which a corresponding link does not exist in the previous map information/data or the updated map information/data and/or for which the link in the updated map information/data is (substantially/significantly) different from the corresponding link in the previous map information/data. For example, the update apparatus 10 may classify the link as a broken link. For example, the update apparatus 10 may comprise means, such as the processor 12 and/or the like, for classifying the link as a broken link. At block 210 it is determined if all of the links of the updated map information/data (e.g., of the new map version) and/or all of the links of the previous map information/data (e.g., the previous map version) have been classified. For example, the update apparatus 10 may determine if all of the links have been classified. For example, the update apparatus 10 may comprise means, such as the processor 12 and/or the like, for determining if all of the links have been classified. If all of the links have been classified, the process may continue to identifying broken clusters. For example, broken clusters may be identified as illustrated in FIG. 7. If all of the links have not yet been classified, the process returns to step 202 and another unclassified link is selected.

If, at block 204, it is determined that the link exists in both the new version of the map and the previous version of the map, the process continues to block 206. At block 206, it is determined if the link is significantly changed from the previous map version to the new map version. For example, the apparatus 10 may determine if the link is significantly changed from the previous map version to the new map version. For example, the apparatus 10 may comprise means, such as the processor 12 and/or the like, for determining if the link is significantly changed from the previous map version to the new map version. For example, it may be determined if the link attributes of the corresponding link in the previous map information/data are the substantially the same as the link attributes of the link in the updated map information/data. For example, it may be determined if the link attributes of the corresponding link are the same as the link attributes of the selected link. If the link attributes of the corresponding link are the same as the link attributes of the selected link, it is determined that the link is unchanged. If the link attributes of the corresponding link for the selected link differ more than a threshold amount from the link attributes for the corresponding link, it may be determined that the corresponding link is changed. In an example embodiment, the threshold amount does not allow for any difference between the link attributes for the selected link and the link attributes for the corresponding link. For example, the link attributes may comprise one or more of a link identifier configured to (uniquely) identify a link, link geometry information/data configured to describe the shape and/or length of the link, a link location configured to provide geo-location information for one or both ends of a link, one or more intersection identifiers configured to identify one or more intersections that define an end of the link, a range of street numbers configured to identify the street numbers located along the link, a traffic direction flow indicator, a carpool lane presence indicator, a car open indicator, a through traffic indicator, time restriction(s), a driving side indicator, a controlled access indicator, a service road indicator, a construction indicator, a ferry indicator, a private road indicator, seasonal closures, link height/weight restrictions, and/or the like.

In example embodiments, link attributes may be associated with a change flag such that if the link attribute is changed in the updated map information/data, the change flag corresponding to that link attribute is set to true and if the link attribute is not changed in the updated map information/data, the change flag associated with that link attribute is set to false. Thus, in an example embodiment, it may be determined if any of the link attributes have been updated and/or changed from the previous map information/data to the updated map information/data by considering the change flags for the updated map information/data.

If at block 206 it is determined that the corresponding is unchanged, the process continues to step 212. At step 208, the selected link is classified as an anchor link. For example, the update apparatus 10 may identify the selected link as an anchor link. For example, the update apparatus 10 may comprise means, such as the processor 12 or the like for identifying the selected link as an anchor link.

At block 214, it is determined if all of the links of the updated map information/data (e.g., of the new map version) and/or all of the links of the previous map information/data (e.g., the previous map version) have been classified. For example, the update apparatus 10 may determine if all of the links have been classified. For example, the update apparatus 10 may comprise means, such as the processor 12 and/or the like, for determining if all of the links have been classified. If all of the links have been classified, the process may continue to identifying broken clusters. For example, broken clusters may be identified as illustrated in FIG. 7. If all of the links have not yet been classified, the process returns to step 202 and another unclassified link is selected.

Identifying a Broken Cluster

FIG. 7 provides a flowchart illustrating operations performed to identify a broken cluster, in accordance with an example embodiment. For example, a broken cluster corresponding to a broken link, in example embodiments, may be a fully connected cluster of broken links and the immediately adjoining anchor links and containing the corresponding broken link. In example embodiments, as described above, the broken cluster may be identified by traversing the map in all directions from the broken link until an anchor link is reached. Each traversed broken link is added to the broken cluster. Information identifying each reached anchor link may also be added to and/or associated with the broken cluster. In some embodiments, a broken cluster may be identified in the updated map information/data, the previous map information/data, or both.

When the process of identifying broken clusters corresponding to the broken links begins, each link classified as a broken link may be labeled as an unresolved broken link. An unresolved broken link may be selected at block 250. For example, the update apparatus 10 may select an unresolved broken link at step 250. For example, the update apparatus 10 may comprise means, such as the processor 12 and/or the like, for selecting an unresolved broken link.

At block 252, the map may be followed in all directions starting from the selected broken link. For example, the update apparatus 10 may follow the map in all directions starting from the selected broken link. For example, the update apparatus 10 may comprise means, such as the processor 12, for following the map in all directions starting from the selected broken link. For example, as described above, the each link adjoining/adjacent the selected broken link may be assessed to determine if the link adjoining/adjacent link is an anchor link.

At block 254, it is determined if a reached link is an anchor link. For example, the update apparatus 10 may determine if the reached link is an anchor link. For example, the update apparatus 10 may comprise means, such as the processor 12 and/or the like, for determining if the reached link is an anchor link. For example, it may be determined if the reached link is classified as an anchor link. If it is determined that the reached link is not an anchor link, the process continues to step 252, and the map is continued to be followed until another link is reached.

If, at block 254, it is determined that the reached link is an anchor link, all of the broken links leading to the anchor link from the selected broken link and the anchor link are added to the broken cluster. For example, the update apparatus 10 may add all of the broken links leading to the anchor link from the selected broken link and the anchor link to the broken cluster. For example, the update apparatus 10 may comprise means, such as the processor 12 and/or the like, for adding all of the broken links leading to the anchor link from the selected broken link and the anchor link to the broken cluster.

At block 258, it is determined if an anchor link has been reached in all directions. For example, it may be determined if there are no further directions that may be followed starting from the selected broken link along which an anchor link has not yet been reached. For example, the update apparatus 10 may determine if an anchor link has been reached in all directions. For example, the apparatus 10 may comprise means, such as the processor 12, for determining if an anchor link has been reached in all directions. If an anchor link has not yet been reached, the process continues to block 252, and the map is followed along a direction along which an anchor link has not yet been reached.

If at block 258, it is determined that an anchor link has been reached along each direction of the map starting from the selected broken link, the process continues to block 260. At block 260, all the broken links in the broken cluster are marked as resolved. For example, the update apparatus 10 may mark all of the broken links of the broken cluster as resolved. For example, the update apparatus 10 may comprise means, such as the processor 12, for marking all of the broken links of the cluster as resolved. If there are broken links remaining that have not been resolved, another broken cluster may be identified. For example, if there are broken links remaining that are still marked unresolved, the process of identifying a broken cluster may be repeated for a selected one of the remaining broken links.

At block 262, it is determined if there are any remaining unresolved broken links. For example, the update apparatus 10 may determine if there are any remaining unresolved broken links. For example, the update apparatus 10 may comprise means, such as processor 12 or the like, for determining if there are any remaining unresolved broken links. If it is determined at block 262 that there are one or more unresolved broken links remaining, the process returns to block 250 and one of the remaining unresolved broken links is selected.

If at block 262 it is determined that all of the broken links have been resolved, the process continues to block 264. At block 264 the broken cluster(s) may be returned and/or provided. For example, the update apparatus 10 may return/provide the broken cluster(s). For example, the update apparatus 10 may comprise means, such as user interface 18, communications interface 16, processor 12, and/or the like, for returning the broken cluster(s).

Navigating Using Mixed-Version Tiles

In example embodiments, the update apparatus 10 may provide (e.g., via the communication interface 16) one or more tiles of map update information/data (e.g., one or more tiles of a new version of a map). A user apparatus 20 may receive (e.g., through the communication interface 26) the one or more tiles of map update information/data (e.g., one or more tiles of a new version of the map) and store the map update information/data locally (e.g., in memory 24). The user apparatus 20 may then use the map update information/data (e.g., the one or more tiles of the new version of the map) to display a map region, navigate a route, and/or the like. In various scenarios, the user apparatus 20 may receive a first tile of map update information/data but not receive a second tile of map update information/data (and/or vice versa), wherein the first tile and the second tile are adjacent tiles in the map. Thus, the user apparatus 20 may have to display a map region and/or navigate a route that encompasses both a new map version tile and a previous map version tile. Thus, in various scenarios the user apparatus 20 may display a map region and/or navigate using mixed-version map tiles.

FIG. 8 is a flowchart illustrating operations performed by the user apparatus 20 in order to display a map region and/or navigate using mixed-version map tiles, in accordance with an example embodiment. Starting at block 302, a map region of interest may be determined. For example, the map region of interest may be determined based on a route to be navigated, the current location of the user apparatus 20, the zoom level with which a map region is to be displayed, and/or the like. In example embodiments, the map region of interest is the map region that is to be displayed by the user interface 28 of the user apparatus 20. For example, a user apparatus 20 may determine a map region of interest. For example, the user apparatus 20 may comprise means, such as a processor 22, a user interface 28, a communications interface 26, sensors 30, and/or the like, for determining a map region of interest.

At block 304, the map tiles in the map region of interest may be identified. For example, the user apparatus 20 may identify the map tiles in the map region of interest. For example, the user apparatus 20 may comprise means, such as the processor 22 or the like, for identifying the map tiles in the map region of interest.

At block 306, it is determined if there is a non-empty change set corresponding to any of the boundaries of the map tiles in the map region of interest. For example, it may be determined if any of the map tiles in the map region of interest have a new change set or an old change set that is non-empty. In example embodiments, only map tile boundaries that are within the map region of interest are considered. For example, the user apparatus 20 may determine if any of the boundaries of the map tiles in the map region of interest have a non-empty change set corresponding thereto. For example, if a tile has a non-empty change set corresponding to a tile boundary that is not within the map region of interest, the non-empty change set may not affect the display or use of the map within the map region of interest. For example, the user apparatus 20 may comprise means, such as the processor 22 or the like, for determining if any of the boundaries of the map tiles in the map region of interest have a non-empty change set corresponding thereto.

If at block 306 it is determined than none of the boundaries of the map tiles in the map region of interest have a non-empty change set corresponding thereto, the process continues to block 308. At block 308, the map update information/data is used/displayed for all of the map tiles for which the map update information/data is available (e.g., the map update information/data is stored in the memory 24). For example, the user apparatus 20 may use/display map update information/data for all of the map tiles for which the map update information/data is available. For example, the user apparatus 20 may comprise means, such as the processor 22, the user interface 28, and/or the like, for using/displaying map update information/data for all of the map tiles for which the map update information/data is available.

If at block 306 it is determined that one of the tiles has a non-empty change set associated therewith and corresponding to a boundary that is within the map region of interest, it is then determined if map update information/data is available for the two or more tiles that share the boundary at block 310. For example, the user apparatus 20 may determine if map update information/data is available for the two or more tiles that share the boundary corresponding to the non-empty change set (e.g., the boundary that intersects the broken cluster represented by the non-empty change set). For example, the user apparatus 20 may comprise means, such as the processor 22, the user interface 28, and/or the like, for determining if map update information/data is available for the two or more tiles that share the boundary corresponding to the non-empty change set. For example, it may be determined if all of the two or more tiles that share the boundary corresponding to the non-empty change set are new map version tiles. For example, map tile meta data may comprise a version indicator for the corresponding map tile. The map tile meta data for each of the two or more tiles may be checked to determine the version of each map tile and determine if each of the two or more tiles are new map version tiles.

If it is determined at block 310 that map update information/data is available for all of the two or more tiles sharing the boundary corresponding to the non-empty change set, then the updated map information/data is used/displayed at block 312. For example, the new change set information/data may be used. In another example, the new version of the map may be used. For example, the user apparatus 20 may use/display the updated map information/data for the two or more tiles sharing the boundary corresponding to the non-empty change set. For example, the user apparatus may comprise means, such as a processor 22, user interface 28, and/or the like, for using/displaying the updated map information/data for the two or more tiles sharing the boundary corresponding to the non-empty change set.

If it is determined at block 310 that map update information/data is not available for all of the two or more tiles sharing the boundary corresponding to the non-empty change set, then the previous map information/data provided as the old change set is used/displayed at block 314. For example, the old change set information/data may be used. In another example, the previous version of the map may be used. For example, the user apparatus 20 may use/display previous map information/data provided as the old change set. For example, the user apparatus may comprise means, such as a processor 22, user interface 28, and/or the like, for using/displaying the previous map information/data provided as the old change set for the two or more tiles sharing the boundary corresponding to the non-empty change set.

In various embodiments, if a tile is a new map version tile and it shares a boundary with a previous version map tile that corresponds to a non-empty change set, the used/displayed tile is the new version map tile except for the links of the broken cluster that comprise the non-empty change set. For example, if tile A is a new version map tile and shares a boundary with previous version map tile B that corresponds to a non-empty change set, the old change set information/data may be used/displayed for the portion of tile A along the boundary between tile A and tile B. If tile A shares another boundary with new version map tile C, new change set information/data may be used/displayed along the boundary between tile A and tile C. Thus, the newest map information/data is used/displayed whenever it is possible to do so while keeping the map locally connected and functional.

III. Example Apparatus

The user apparatus 20 and/or update apparatus 10 of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the apparatus may be embodied in other types of computing devices, such as a server, a personal computer, a computer workstation, a laptop computer, a plurality of networked computing devices or the like, that are configured to analyze probe points for route planning or other purposes. In this regard, FIG. 2A depicts an update apparatus 10 and FIG. 2B depicts a user apparatus 20 of an example embodiment that may be embodied by various computing devices including those identified above. As shown, the update apparatus 10 of an example embodiment may include, may be associated with or may otherwise be in communication with a processor 12 and a memory device 14 and optionally a communication interface 16 and/or a user interface 18. Similarly, a user apparatus 20 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the update apparatus 10 and/or user apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the update apparatus 10 and/or user apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The update apparatus 10 and/or the user apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the update apparatus 10 and/or user apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 4, 6, and 7 illustrate flowcharts of apparatuses 10, 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, by a user apparatus comprising a processor and a memory storing a first tile and a second tile of a digital map, a map update for at least the first tile comprising map update data, the map update comprising updated map data for the first tile corresponding to a present version of the map data and an old change set, the old change set consists of previous map data for the first tile corresponding to one or more changed or new links intersected by a tile boundary between the first tile and the second tile, the previous map data corresponding to a previous version of the map data;

determining, by the user apparatus, a map region of interest, the map region of interest comprising at least a portion of the first tile;

determining, by the user apparatus, that the map region of interest comprises at least a portion of the second tile;

in response to determining that the map region of interest comprises the at least a portion of the second tile, determining, by the user apparatus, whether a map update for the second tile corresponding to the present version of the map data has been received;

responsive to determining that the map update for the second tile corresponding to the present version of the map data has been received, at least one of (a) not using, by the user apparatus, the previous map data for the first tile when performing a navigation function corresponding to the map region of interest or (b) not displaying, by the user apparatus, the previous map data for the first tile for the one or more changed or new links intersected by the tile boundary when displaying the map region of interest via a user interface of the user apparatus; and responsive to determining that the map update for the second tile corresponding to the present version of the map data has not been received, at least one of (a) using, by the user apparatus, the previous map data for the first tile when performing a navigation function corresponding to the map region of interest or (b) displaying, by the user apparatus, the previous map data for the first tile for the one or more changed or new links intersected by the tile boundary when displaying the map region of interest via the user interface of the user apparatus.

2. The method according to claim 1, wherein responsive to determining that a map update for the second tile has been received, using or displaying updated map data for the portion of the first tile within the map region of interest.

3. The method according to claim 1, wherein the previous map data corresponding to the one or more changed or new links intersected by the tile boundary corresponds to a broken cluster that is fully connected and only partially contained within the first tile.

4. The method according to claim 3, wherein the previous map data of the map update for the first tile only comprises previous map data for the portion of the fully connected broken cluster that is contained within the first tile.

5. The method according to claim 3, wherein when it is determined that a map update for the second tile has not been received, using or displaying the previous map data for the first tile for only the broken cluster and using or displaying the updated map data for the remainder of the area of interest that corresponds to the first tile.

6. The method according to claim 1 wherein the previous map data of the map update consists of (a) previous map data for making the map locally connected across the tile boundary when the map update for the second tile has not been received and (b) an indication of a map version corresponding to the previous map data.

7. The method according to claim 1 wherein the map region of interest is determined based on at least one of a current location, a route, or a zoom level.

8. An apparatus comprising at least one processor and at least one memory storing (a) computer program code and (b) a first tile and a second tile of a digital map, the at least one memory and the computer program code configured to, with the processor, cause the apparatus to at least:

receive a map update for at least the first tile comprising map update data, the map update comprising updated map data for the first tile corresponding to a present version of the map data and an old change set, the old change set consists of previous map data for the first tile corresponding to one or more changed or new links intersected by a tile boundary between the first tile and the second tile, the previous map data corresponding to a previous version of the map data;

determine a map region of interest, the map region of interest comprising at least a portion of the first tile;

determine that the map region of interest comprises at least a portion of the second tile;

in response to determining that the map region of interest comprises the at least a portion of the second tile, determine whether a map update for the second tile corresponding to the present version of the map data has been received;

responsive to determining that the map update for the second tile corresponding to the present version of the map data has been received, at least one of (a) not use the previous map data for the first tile when performing a navigation function corresponding to the map region of interest or (b) not display the previous map data for the first tile for the one or more changed or new links intersected by the tile boundary when displaying the map region of interest via a user interface of the apparatus; and responsive to determining that the map update for the second tile corresponding to the present version of the map data has not been received, at least one of (a) use the previous map data for the first tile when performing a navigation function corresponding to the map region of interest or (b) display the previous map data for the first tile for the one or more changed or new links intersected by the tile boundary when displaying the map region of interest via the user interface of the apparatus.

9. The apparatus according to claim 8, wherein the at least one memory and the computer program code are further configured to, with the processor, cause the apparatus to at least, responsive to determining that a map update for the second tile has been received, use or display updated map data for the portion of the first tile within the map region of interest.

10. The apparatus according to claim 8, wherein the previous map data corresponding to the one or more changed or new links intersected by the tile boundary corresponds to a broken cluster that is fully connected and is only partially contained within the first tile.

11. The apparatus according to claim 10, wherein the previous map data of the map update for the first tile only comprises previous map data for the portion of the fully connected broken cluster that is contained within the first tile.

12. The apparatus according to claim 10, wherein the at least one memory and the computer program code are further configured to, with the processor, cause the apparatus to at least, when it is determined that a map update for the second tile has not been received, use or display the previous map data for the first tile for only the broken cluster and use or display the updated map data for the remainder of the area of interest that corresponds to the first tile.

13. The apparatus according to claim 8 wherein the previous map data of the map update consists of (a) previous map data for making the map locally connected across the tile boundary when the map update for the second tile has not been received and (b) an indication of a map version corresponding to the previous map data.

14. The apparatus according to claim 8 wherein the map region of interest is determined based on at least one of a current location, a route, or a zoom level.

15. A computer program product comprising at least one non-transitory computer-readable storage medium having computer-executable program code instructions stored therein, the computer-executable program code instructions comprising program code instructions configured to:
receive a map update for at least a first tile comprising map update data, the map update comprising updated map data for the first tile corresponding to a present version of the map data and an old change set, the old change set consists of previous map data for the first tile corresponding to one or more changed or new links intersected by a tile boundary between the first tile and a second tile, the previous map data corresponding to a previous version of the map data;
determine a map region of interest, the map region of interest comprising at least a portion of the first tile;
determine that the map region of interest comprises at least a portion of the second tile;
in response to determining that the map region of interest comprises the at least a portion of the second tile, determine whether a map update for the second tile corresponding to the present version of the map data has been received;
responsive to determining that the map update for the second tile corresponding to the present version of the map data has been received, at least one of (a) not use the previous map data for the first tile when performing a navigation function corresponding to the map region of interest or (b) not display the previous map data for the first tile for the one or more changed or new links intersected by the tile boundary when displaying the map region of interest via a user interface of a user apparatus; and
responsive to determining that the map update for the second tile corresponding to the present version of the map data has not been received, at least one of (a) use the previous map data for the first tile when performing a navigation function corresponding to the map region of interest or (b) display the previous map data for the first tile for the one or more changed or new links intersected by the tile boundary when displaying the map region of interest via the user interface of the user apparatus.

16. The computer program product according to claim 15, wherein the at least one memory and the computer program code are further configured to, with the processor, cause the apparatus to at least, responsive to determining that a map update for the second tile has been received, use or display updated map data for the portion of the first tile within the map region of interest.

17. The computer program product according to claim 15, wherein the previous map data corresponding to the one or more changed or new links intersected by the tile boundary corresponds to a broken cluster that is fully connected and is only partially contained within the first tile.

18. The computer program product according to claim 17, wherein the previous map data of the map update for the first tile only comprises previous map data for the portion of the fully connected broken cluster that is contained within the first tile.

19. The computer program product according to claim 17, wherein the at least one memory and the computer program code are further configured to, with the processor, cause the apparatus to at least, when it is determined that a map update for the second tile has not been received, use or display the previous map data for the first tile for only the broken cluster and use or display the updated map data for the remainder of the area of interest that corresponds to the first tile.

20. The computer program product according to claim 15 wherein the map region of interest is determined based on at least one of a current location, a route, or a zoom level.

* * * * *